(12) United States Patent
Yusa

(10) Patent No.: US 8,311,170 B2
(45) Date of Patent: Nov. 13, 2012

(54) DATA TRANSFER SYSTEM

(75) Inventor: Atsushi Yusa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 568 days.

(21) Appl. No.: 12/617,759

(22) Filed: Nov. 13, 2009

(65) Prior Publication Data

US 2010/0128830 A1 May 27, 2010

(30) Foreign Application Priority Data

Nov. 25, 2008 (JP) ................. 2008-299432

(51) Int. Cl.
*H04L 7/00* (2006.01)
(52) U.S. Cl. ........ 375/354; 375/316; 375/260; 327/149; 327/141; 341/123
(58) Field of Classification Search .......... 375/354, 375/260, 362; 327/149, 141; 341/123
See application file for complete search history.

(56) References Cited

U.S. PATENT DOCUMENTS

| | | | | |
|---|---|---|---|---|
| 5,587,691 A * | 12/1996 | Yabe et al. | | 331/44 |
| 5,787,132 A * | 7/1998 | Kishigami et al. | | 375/354 |
| 6,249,235 B1 * | 6/2001 | Iwasaki | | 341/123 |
| 6,359,479 B1 * | 3/2002 | Oprescu | | 327/141 |
| 7,167,031 B2 * | 1/2007 | Ishii | | 327/149 |
| 7,176,721 B2 * | 2/2007 | Ho et al. | | 326/82 |

FOREIGN PATENT DOCUMENTS

JP 10-303874 11/1998

* cited by examiner

*Primary Examiner* — Eva Puente
(74) *Attorney, Agent, or Firm* — Volentine & Whitt, PLLC

(57) ABSTRACT

A data transfer system which can surely transfer data between two function circuits which operate synchronously with different clock frequencies. A data loading signal is generated just before timing when edges of two clocks of different frequencies coincide. Only information data received by the function circuit on a transfer data reception side within an existence period of the data loading signal is determined to be valid.

5 Claims, 8 Drawing Sheets

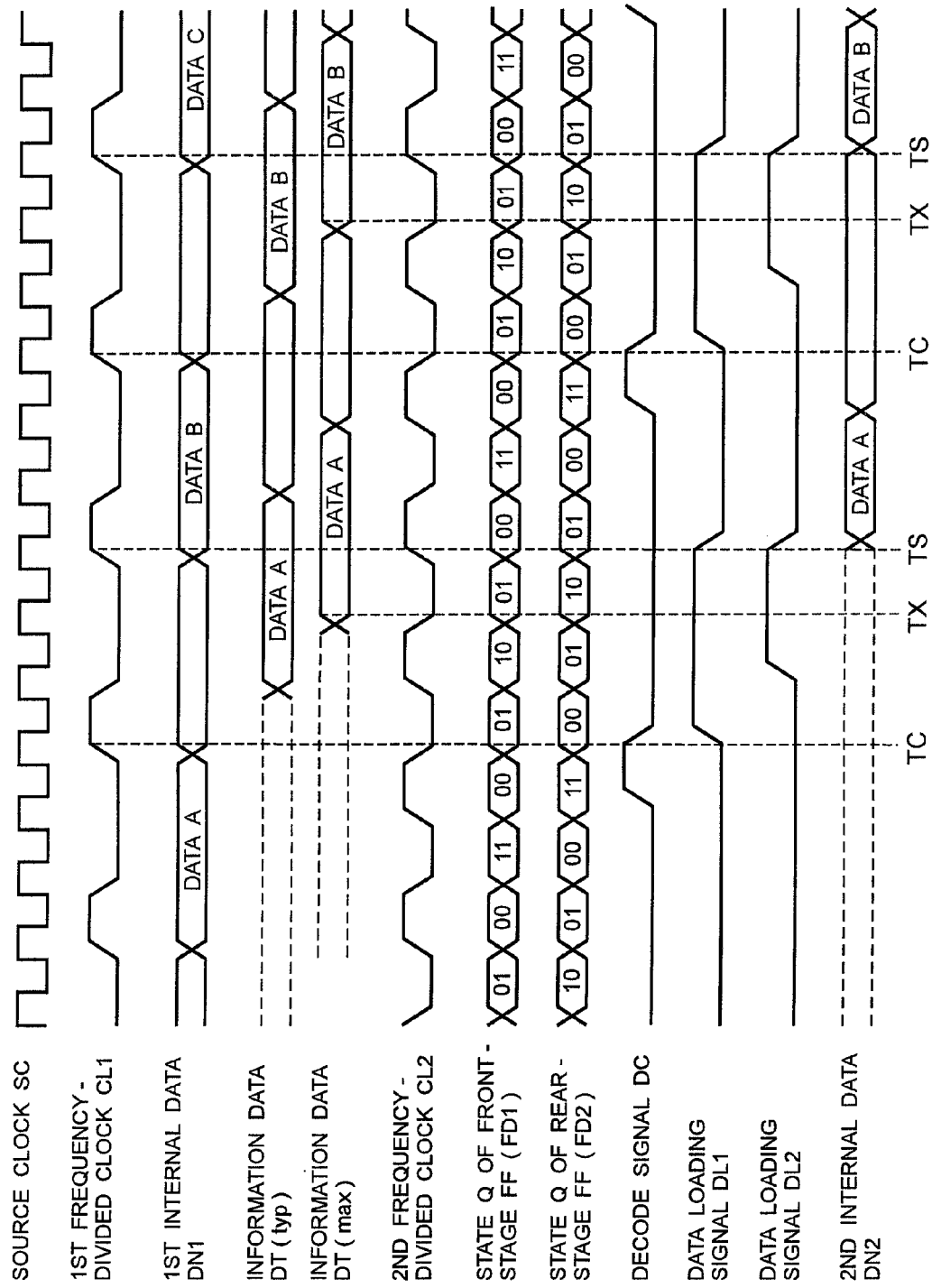

DATA TRANSFER SYSTEM

BACKGROUND OF THE INVENTION

1. Field of the Invention

The invention relates to a data transfer system for transferring data between two function circuits which operate synchronously with different clock frequencies.

2. Description of the Related Art

Ordinarily, a data processing apparatus such as a computer is constituted by a plurality of circuits and units. Proper operating frequencies are set into those circuits in accordance with their operating characteristics, respectively. Specifically speaking, the data processing apparatus has a plurality of frequency dividing circuits each for generating a frequency-divided clock by frequency-dividing a source clock and supplies the frequency-divided clock of the proper operating frequency every circuit. In the case, although the circuit operates at the different operating frequency every circuit, in the case of transmitting and receiving data between the two circuits which operate at the different operating frequencies, it is necessary to properly adjust transmission and reception timing.

As an method for adjusting the transmission and reception timing, a method is known in which transmitting and receiving of data is performed by using timing at which leading edges or trailing edges of two clock signals having the different operating frequencies coincide. For example, Japanese Patent Kokai No. 10-303874 (Patent Literature 1), discloses a sync edge detecting system at the time of transferring data between two circuits which operate synchronously with two clock signals having different frequencies. According to this system, sync signals SYNCa and SYNCb are generated at timing when edges of two clock signals CLKa and CLKb and the data transfer is performed by using the sync signals.

SUMMARY OF THE INVENTION

When performing the data transfer by the system disclosed in Patent Literature 1, it is presumed that the reception side circuit receives the transfer data from the transmission side circuit at timing when the clock signal CLKb rises within a period of time during which the sync signal SYNCa is outputted. In this case, the timing when the reception side circuit receives the transfer data is the timing of an edge of the clock signal CLKb just after the timing when the edges of the two clock signals CLKa and CLKb coincide. At the timing, if a large delay occurred in the transfer data due to various kinds of conditions such as manufacturing process, temperature, and voltage, there is a problem that the reception side circuit cannot correctly receive the transfer data.

The invention has been made in view of the problem mentioned above and it is an object of the invention to provide a data transfer system which can surely transfer data between two function circuits which operate synchronously with different clock frequencies.

According to the invention, there is provided a data transfer system comprising: a source clock generating part for generating a source clock; a frequency-divided clock generating part for generating a first frequency-divided clock and a second frequency-divided clock having different periods by frequency-dividing the source clock; a first function circuit which operates synchronously with the first frequency-divided clock and generates information data; and a second function circuit which operates synchronously with the second frequency-divided clock and receives the information data, wherein the system further includes a data loading signal generating part for generating a data loading signal just before coincident timing when an edge of the first frequency-divided clock and an edge of the second frequency-divided clock coincide, and the second function circuit determines that only the reception of the information data within an existence period of time of the data loading signal is valid.

According to the data transfer system of the invention, the information data can be correctly transferred between the two function circuits which operate synchronously with the different clock frequencies.

BRIEF DESCRIPTION OF THE DRAWINGS

FIG. 8 is a time chart showing signals such as data loading signals according to the second embodiment.

DETAILED DESCRIPTION OF THE PREFERRED EMBODIMENTS

Embodiments according to the invention will be described in detail hereinbelow with reference to the drawings.

First Embodiment

Figure 1:
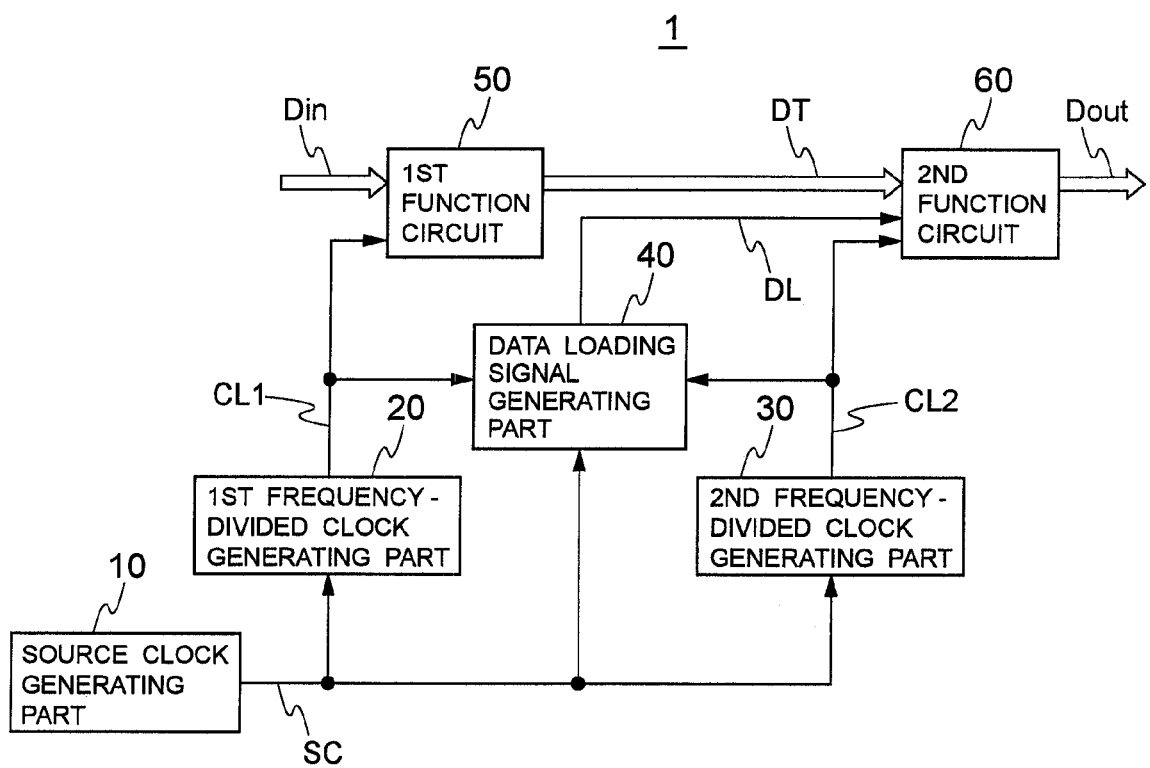
FIG. 1 is a block diagram showing a data transfer system according to the first embodiment.

FIG. 1 is a block diagram showing a data transfer system 1 according to the embodiment. The data transfer system 1 includes: a source clock generating part 10; a first frequency-divided clock generating part 20; a second frequency-divided clock generating part 30; a data loading signal generating part 40; a first function circuit 50; and a second function circuit 60.

The source clock generating part 10 generates a source clock SC and supplies it to the first frequency-divided clock generating part 20, the second frequency-divided clock generating part 30, and the data loading signal generating part 40, respectively. The frequency of the source clock SC is not particularly limited and, for example, 600 MHz or the like may be used.

The first frequency-divided clock generating part 20 generated a first frequency-divided clock CL1 by frequency-dividing the source clock SC from the source clock generating part 10 into ⅓ and supplies it to the data loading signal generating part 40 and the first function circuit 50, respectively. For example, when the frequency of the source clock SC is equal to 600 MHz, the first frequency-divided clock generating part 20 generates the first frequency-divided clock CL1 of a frequency of 200 MHz.

The second frequency-divided clock generating part 30 generates a second frequency-divided clock CL2 by frequency-dividing the source clock SC from the source clock generating part 10 into ½ and supplies it to the data loading signal generating part 40 and the second function circuit 60, respectively. For example, when the frequency of the source clock SC is equal to 600 MHz, the second frequency-divided clock generating part 30 generates the second frequency-divided clock CL2 of a frequency of 300 MHz.

The data loading signal generating part 40 generates a data loading signal DL on the basis of a signal level of the first frequency-divided clock CL1 from the first frequency-divided clock generating part 20 and a signal level of the second frequency-divided clock CL2 from the second frequency-divided clock generating part 30 and supplies it to the second function circuit 60.

The first function circuit 50 is a circuit which operates synchronously with the first frequency-divided clock CL1 from the first frequency-divided clock generating part 20. The first function circuit 50 receives input data Din in response to a leading edge of the first frequency-divided clock CL1 and generates first internal data DN1 (not shown) on the basis of it. The first function circuit 50 transmits information data DT obtained by properly executing processes to the first internal data DN1 as needed to the second function circuit 60 synchronously with the first frequency-divided clock CL1.

The second function circuit 60 is a circuit which operates synchronously with the second frequency-divided clock CL2 from the second frequency-divided clock generating part 30. The second function circuit 60 receives the information data DT from the first function circuit 50. The second function circuit 60 also receives the data loading signal DL from the data loading signal generating part 40 and determines that only the information data DT received in response to a leading edge of the second frequency-divided clock CL2 existing in an interval of the data loading signal DL is valid. The second function circuit 60 generates, synchronously with the second frequency-divided clock CL2, second internal data DN2 of a signal level which is the same as that of the information data DT which has been determined to be valid. The second function circuit 60 also generates transfer data Dout obtained by properly executing processes to the second internal data DN2 as needed.

Each of the first function circuit 50 and the second function circuit 60 is, for example, a circuit for conducting a calculation task or conducting a storage task. For example, assuming that the first function circuit 50 is the calculating circuit and the second function circuit 60 is the storing circuit, when the first function circuit 50 transmits the data obtained by the calculation as information data DT to the second function circuit 60 and the second function circuit 60 stores the information data DT, the information data DT is transmitted and received between the first function circuit 50 and the second function circuit 60. For example, assuming that the first function circuit 50 is the storing circuit and the second function circuit 60 is the calculating circuit, even when the first function circuit 50 transmits the data for the calculation as information data DT to the second function circuit 60 and the second function circuit 60 executes the calculation by using the information data DT, the information data DT is transmitted and received between the first function circuit 50 and the second function circuit 60.

Figure 2:
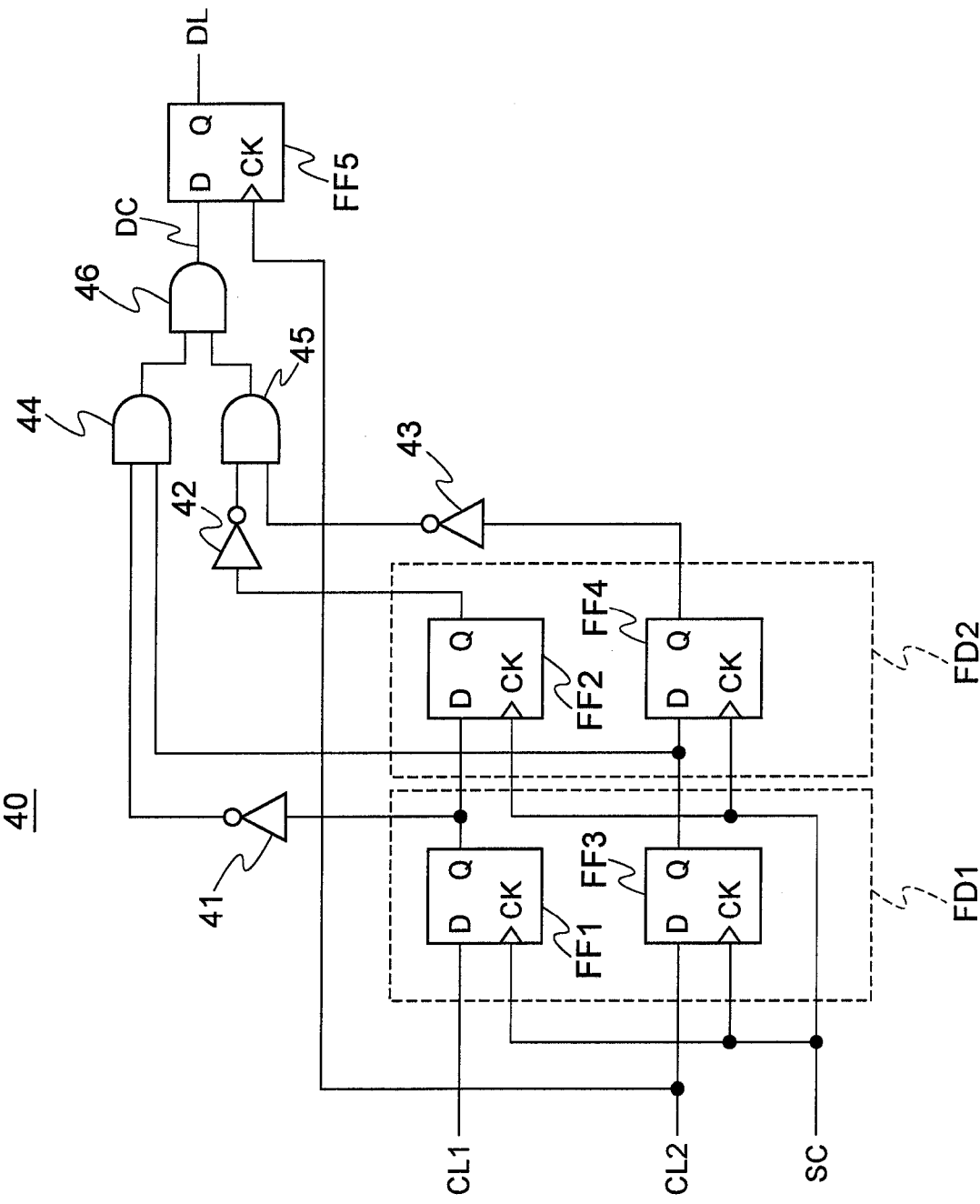
FIG. 2 is a block diagram showing a data loading signal generating part according to the first embodiment.

FIG. 2 is a block diagram showing the data loading signal generating part 40. The data loading signal generating part 40 includes flip-flops FF1 to FF5, inverters 41 to 43, and AND circuits 44 to 46.

Each of the flip-flops FF1 to FF5 is a flip-flop of a D (delay) type. Each of the flip-flops FF1 to FF4 operates synchronously with the source clock SC. The flip-flop FF5 operates synchronously with the second frequency-divided clock CL2. The first frequency-divided clock CL1 is supplied to an input D of the flip-flop FF1. The second frequency-divided clock CL2 is supplied to an input D of the flip-flop FF3. An output Q of the flip-flop FF1 and an input D of the flip-flop FF2 are mutually connected. An output Q of the flip-flop FF3 and an input D of the flip-flop FF4 are mutually connected.

The flip-flops FF1 and FF3 are referred to as a front-stage flip-flop FD1 and the flip-flops FF2 and FF4 are referred to as a post-stage flip-flop FD2 hereinbelow. The signal level at present (also referred to as a present signal level) of the first frequency-divided clock CL1 is held as "0" or "1" in the flip-flop FF1. The signal level just before the first frequency-divided clock CL1 (also referred to as a just-previous signal level), that is, the signal level at the timing of one period of the source clock before the present time is held as "0" or "1" in the flip-flop FF3. Similarly, the present signal level of the second frequency-divided clock CL2 is held in the flip-flop FF3. The just-previous signal level of the second frequency-divided clock CL2 is held in the flip-flop FF4.

A signal from the output Q of the flip-flop FF1 is supplied to one input of the AND circuit 44 through the inverter 41 and a signal from the output Q of the flip-flop FF3 is supplied to the other input. A signal from an output Q of the flip-flop FF2 is supplied to one input of the AND circuit 45 through the inverter 42 and a signal from an output Q of the flip-flop FF4 is supplied to the other input through the inverter 43. A signal from an output of the AND circuit 44 is supplied to one input of the AND circuit 46 and a signal from an output of the AND circuit 45 is supplied to the other input.

A decoding signal DC from an output of the AND circuit 46 is supplied to an input D of the flip-flop FF5 and the data loading signal DL is generated from the output Q synchronously with the second frequency-divided clock CL2.

By the foregoing construction, when a value of the output Q of the flip-flop FF1 is equal to "0", a value of the output Q of the FF3 is equal to "1", a value of the output Q of the FF2 is equal to "0", and a value of the output Q of the FF4 is equal to "0", the AND circuit 46 generates the decoding signal DC of "1". That is, in an interval corresponding to two periods of the source clock, when the signal level of the first frequency-divided clock CL1 is equal to "0" (low level) and the signal level of the second frequency-divided clock CL2 changes from "0" (low level) to "1" (high level), the AND circuit 46 generates the decoding signal DC of "1" (high level).

Timing when the leading edge of the first frequency-divided clock CL1 and the leading edge of the second frequency-divided clock CL2 coincide is referred to as edge coincident timing TS hereinbelow. For example, when a frequency ratio between the first frequency-divided clock CL1 and the second frequency-divided clock CL2 is equal to 2:3, since its least common multiple is equal to 6, the leading edge of the first frequency-divided clock CL1 and the leading edge of the second frequency-divided clock CL2 coincide with each other every source clock of six periods. In other words, the edge coincident timing TS arrives every source clock of six periods.

Timing of the leading edge of the second frequency-divided clock CL2 just before the edge coincident timing TS is referred to as just-previous edge timing TC hereinbelow. As mentioned above, when the value of the output Q of the flip-flop FF1 is equal to "0", the value of the output Q of the FF3 is equal to "1", the value of the output Q of the FF2 is equal to "0", and the value of the output Q of the FF4 is equal to "0", the AND circuit 46 generates the decoding signal DC of "1" (high level), so that the decoding signal DC (high level) from the AND circuit 46 is captured by the flip-flop FF5 at the just-previous edge timing TC. Since the flip-flop FF5 operates synchronously with the second frequency-divided clock CL2, the flip-flop FF5 generates and generates the data loading signal DL of the high level within a period of time (hereinbelow, referred to as an edge effective period) from the just-previous edge timing TC to the edge coincident timing TS. The edge effective period corresponds to one period of the second frequency-divided clock CL2.

Figure 3:
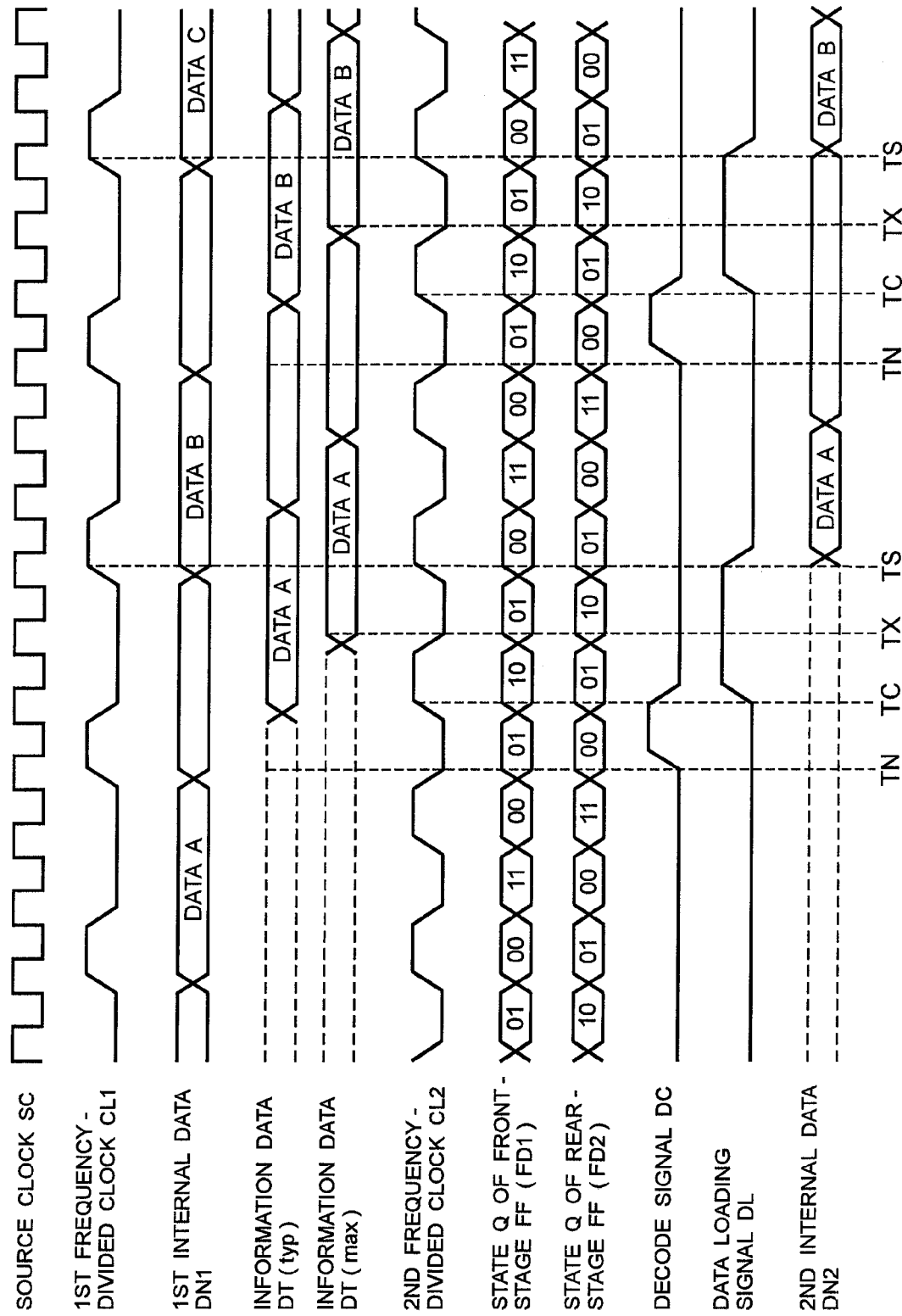
FIG. 3 is a time chart showing signals such as a data loading signal according to the first embodiment.

FIG. 3 is a time chart showing signals such as a data loading signal DL. The operation of the data transfer system 1 will be described hereinbelow with reference to FIG. 3.

The source clock SC is generated by the source clock generating part 10 and supplied to the first frequency-divided clock generating part 20, the second frequency-divided clock generating part 30, and the data loading signal generating part 40, respectively.

The first frequency-divided clock generating part 20 generates the first frequency-divided clock CL1 by frequency-dividing the source clock SC into ½ and supplies it to the data loading signal generating part 40 and the first function circuit 50, respectively.

The first function circuit 50 receives the input data Din (shown in FIG. 1) in response to the leading edge of the first frequency-divided clock CL1 and generates the first internal data DN1 on the basis of it. The first function circuit 50 transmits the information data DT obtained by properly executing the processes to the first internal data DN1 as needed to the second function circuit 60 synchronously with the first frequency-divided clock CL1. The information data DT (typ and max) at a point of time when it is supplied to the second function circuit 60 is shown in FIG. 3. A transfer delay has occurred in the information data DT at the point of time due to an internal delay in the first function circuit 50 and wiring delay in a range from the first function circuit 50 to the second function circuit 60. The information data DT(typ) is the information data in the case where the standard transfer delay occurred. The information data DT(max) is the information data in the case where a large delay occurred by environmental conditions such as temperature and voltage. Arrival timing TX of the information data DT(max) to the second function circuit 60 corresponds to a delay of one period of the second frequency-divided clock CL2 in consideration of arrival timing TN of the information data DT to the second function circuit 60 in the case where there is no delay that is caused by the environmental conditions such as a voltage.

The second frequency-divided clock generating part 30 generates the second frequency-divided clock CL2 by frequency-dividing the source clock SC into ⅓ and supplies it to the data loading signal generating part 40 and the second function circuit 60, respectively.

The second function circuit 60 receives the information data DT from the first function circuit 50 synchronously with the second frequency-divided clock CL2 and determines that only the information data DT received in response to the leading edge of the second frequency-divided clock CL2 existing in the interval of the data loading signal DL from the data loading signal generating part 40 is valid. The data loading signal DL is generated on the basis of the values held in the flip-flops FF1 to FF5 included in the data loading signal generating part 40.

A state Q of the front-stage flip-flop FD1 included in the data loading signal generating part 40 is shown by a binary value of "0" or "1" every period of the source clock. The value on the left side of the binary value indicates the value of a state Q of the flip-flop FF1 and the value on the right side indicates the value of a state Q of the flip-flop FF3. For example, when the value of the state Q of the flip-flop FF1 is equal to "0" and the value of the state Q of the flip-flop FF3 is equal to "1", the binary value is expressed by "01".

Similarly, a state Q of the post-stage flip-flop FD2 included in the data loading signal generating part 40 is shown by a binary value of "0" or "1" every period of the source clock. The value on the left side of the binary value indicates the value of a state Q of the flip-flop FF2 and the value on the right side indicates the value of a state Q of the flip-flop FF4. For example, when the value of the state Q of the flip-flop FF2 is equal to "1" and the value of the state Q of the flip-flop FF4 is equal to "0", the binary value is expressed by "10".

The AND circuit 46 included in the data loading signal generating part 40 generates the decoding signal DC of "1" (high level) when the value of the state Q of the flip-flop FF1 is equal to "0", the value of the state Q of the FF3 is equal to "1", the value of the state Q of the FF2 is equal to "0", and the value of the state Q of the FF4 is equal to "0". Since the flip-flops FF1 to FF4 operate synchronously with the source clock SC, a period of time during which the signal level of the decoding signal DC is equal to "1" (high level) is a period of time corresponding to one period of the source clock.

The decoding signal DC of "1" (high level) is captured by the flip-flop FF5 in response to the leading edge of the second frequency-divided clock CL2 at the just-previous edge timing TC and the data loading signal DL is generated. Since the flip-flop FF5 operates synchronously with the second frequency-divided clock CL2, the existence period of the data loading signal DL is a period of time corresponding to one period of the second frequency-divided clock CL2. The data loading signal DL is, therefore, generated and outputted for the period of time from the just-previous edge timing TC to the edge coincident timing TS.

The second function circuit 60 determines that only the information data DT received in response to the leading edge of the second frequency-divided clock CL2 in the existence period of the data loading signal DL of "1" (high level), that is, in response to the leading edge of the second frequency-divided clock CL2 at the edge coincident timing TS is valid, and generates the second internal data DN2. For example, the second function circuit 60 receives data A transferred from the first function circuit 50 in response to the leading edge of the second frequency-divided clock CL2 at the edge coincident timing TS and generates data corresponding to the data A as second internal data DN2. Even if the standard delay occurred in the information data DT (information data DT(typ)) or even if the large delay occurred by the environmental conditions such as temperature and voltage (information data DT(max)), the second function circuit 60 can receive the data A in response to the leading edge of the second frequency-divided clock CL2 at the edge coincident timing TS.

As mentioned above, the data transfer system 1 according to the embodiment generates the data loading signal DL just before the timing when the leading edge of the first frequency-divided clock CL1 and the leading edge of the second frequency-divided clock CL2 coincide (edge coincident timing TS). In detail, the system 1 generates the data loading signal DL in an interval from the timing (edge coincident timing TS) of the leading edge of the second frequency-divided clock CL2 just before the edge coincident timing TS to the edge coincident timing TS. The second function circuit 60 determines that only the information data DT received in response to the leading edge of the second frequency-divided clock existing in the interval of the data loading signal DL is valid. The second function circuit 60, consequently, receives the information data DT from the first function circuit 50 at the timing when the leading edge of the first frequency-divided clock CL1 and the leading edge of the second frequency-divided clock CL2 coincide.

When the data is transmitted and received between the two function circuits which operate synchronously with the clocks of the different frequencies, if the data is transmitted and received at the timing when the edges of the clocks do not coincide unlike the embodiment, the transfer timing of the data becomes severe. When the transfer delay time of the data changes due to a variation in, for example, manufacturing process, temperature, voltage, and the like, the data cannot be correctly transmitted and received. In contrast, according to the data transfer system 1 of the embodiment, the function circuit on the reception side can capture the transfer data at the timing when the edges of the clocks of the different frequencies coincide even if the transfer delay time of the data changed. Thus, both of a setup time and a holding time can be sufficiently secured and the data can be certainly transmitted and received.

Naturally, the second function circuit 60 can normally receive the information data DT(typ) in the case where the standard delay occurred due to the internal delay of the circuit and the wiring delay and can also normally receive the information data DT(max) in the case where the large delay occurred by the environmental conditions such as temperature and voltage. That is, even if the delay of one period of the second frequency-divided clock CL2 occurred in the information data DT (that is, even if the information data DT arrived at the second function circuit 60 at the timing TX) in consideration of the arrival timing TN of the information data DT to the second function circuit 60 in the case where there is no delay that is caused by the environmental conditions such as voltage, the second function circuit 60 can correctly receive the information data DT.

Since the data loading signal generating part 40 generates the data loading signal DL by using the source clock SC, there is no need to separately add another circuit for generating signals or the like and the data can be surely transmitted and received by the simple circuit construction.

Second Embodiment

Figure 4:
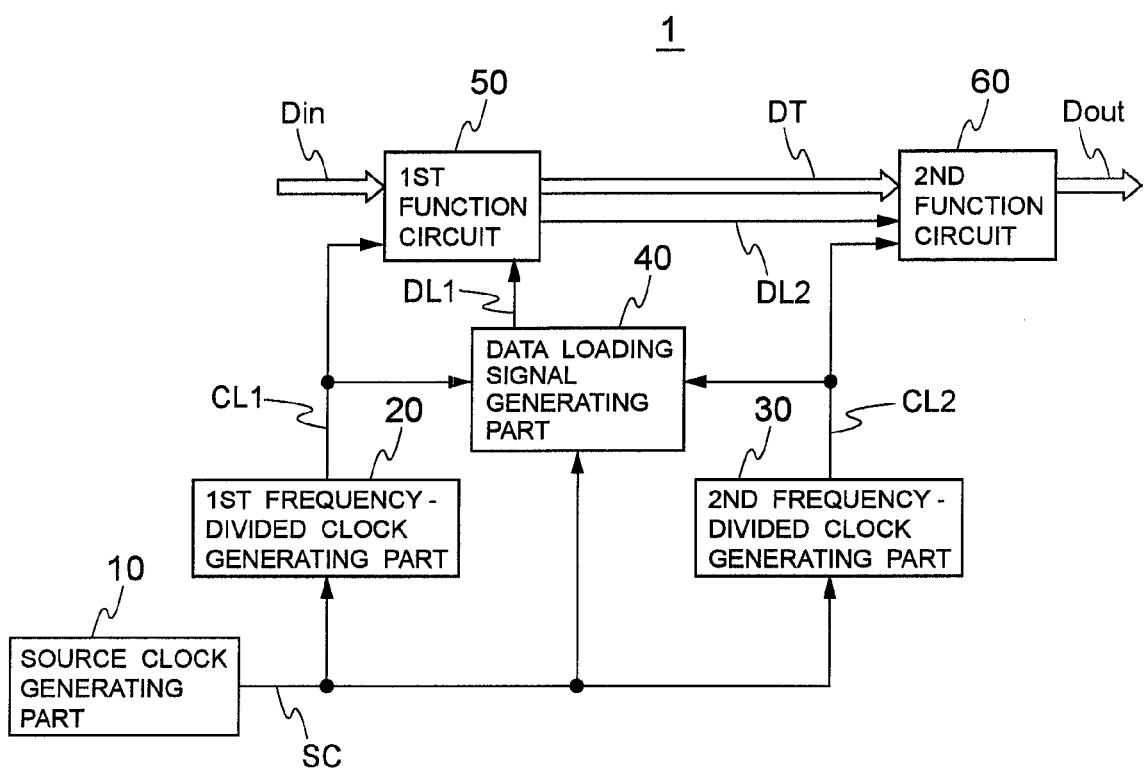
FIG. 4 is a block diagram showing a data transfer system according to the second embodiment.

FIG. 4 is a block diagram showing the data transfer system 1 according to the embodiment. In this embodiment, the data loading signal generating part 40 supplies a data loading signal DL2 to the second function circuit 60 through the first function circuit 50. By using the construction as mentioned above, the data loading signal DL2 can be controlled as needed in the first function circuit 50. Since the first function circuit 50 operates synchronously with the first frequency-divided clock CL1, the data loading signal generating part 40 supplies a data loading signal DL1 of a period of time corresponding to the period of the first frequency-divided clock CL1 to the first function circuit 50.

Figure 5:
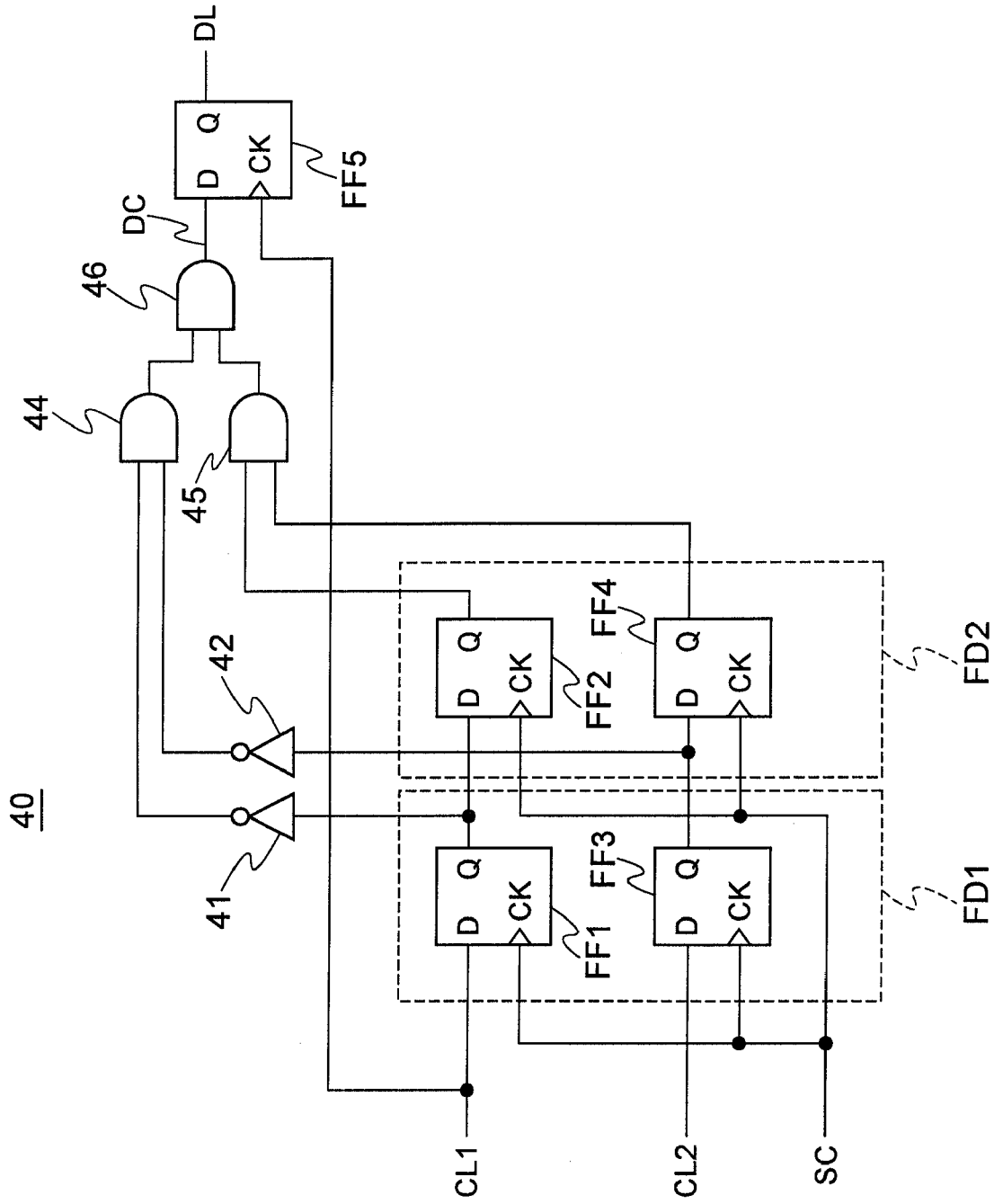
FIG. 5 is a block diagram showing a data loading signal generating part according to the second embodiment.

FIG. 5 is a block diagram showing the data loading signal generating part 40 according to the second embodiment. Although the data loading signal generating part 40 according to the embodiment has a construction almost similar to that in the first embodiment, it differs therefrom with respect to the following points.

When the value of the output Q of the flip-flop FF1 is equal to "0", the value of the output Q of the FF3 is equal to "0", the value of the output Q of the FF2 is equal to "1", and the value of the output Q of the FF4 is equal to "1", the AND circuit 46 generates the decoding signal DC of "1". That is, in an interval corresponding to two periods of the source clock, when both of the signal level of the first frequency-divided clock CL1 and the signal level of the second frequency-divided clock CL2 change from "1" (high level) to "0" (low level), the AND circuit 46 outputs the decoding signal DC of "1" (high level).

The flip-flop FF5 operates synchronously with the first frequency-divided clock CL1. This is because the data loading signal DL1 is supplied to the first function circuit 50. In the embodiment, the timing of the leading edge of the first frequency-divided clock CL1 just before the edge coincident timing TS is referred to as just-previous edge timing TC hereinbelow. The decoding signal DC of (high level) from the AND circuit 46 is captured by the flip-flop FF5 at the just-previous edge timing TC. Since the flip-flop FF5 operates synchronously with the first frequency-divided clock CL1, it generates and outputs the data loading signal DL1 of the high level within a period of time (edge effective period) from the just-previous edge timing TC to the edge coincident timing TS. The edge effective period corresponds to one period of the first frequency-divided clock CL1.

When the data loading signal DL1 from the data loading signal generating part 40 is relayed to the second function circuit 60, the first function circuit 50 adjusts the existence period of the data loading signal DL1 to the period of time corresponding to one period of the second frequency-divided clock CL2 and generates the data loading signal DL2. A data loading signal relay unit 51 included in the first function circuit 50 adjusts the existence period of the data loading signal DL1 and generates the data loading signal DL2.

Figure 6:
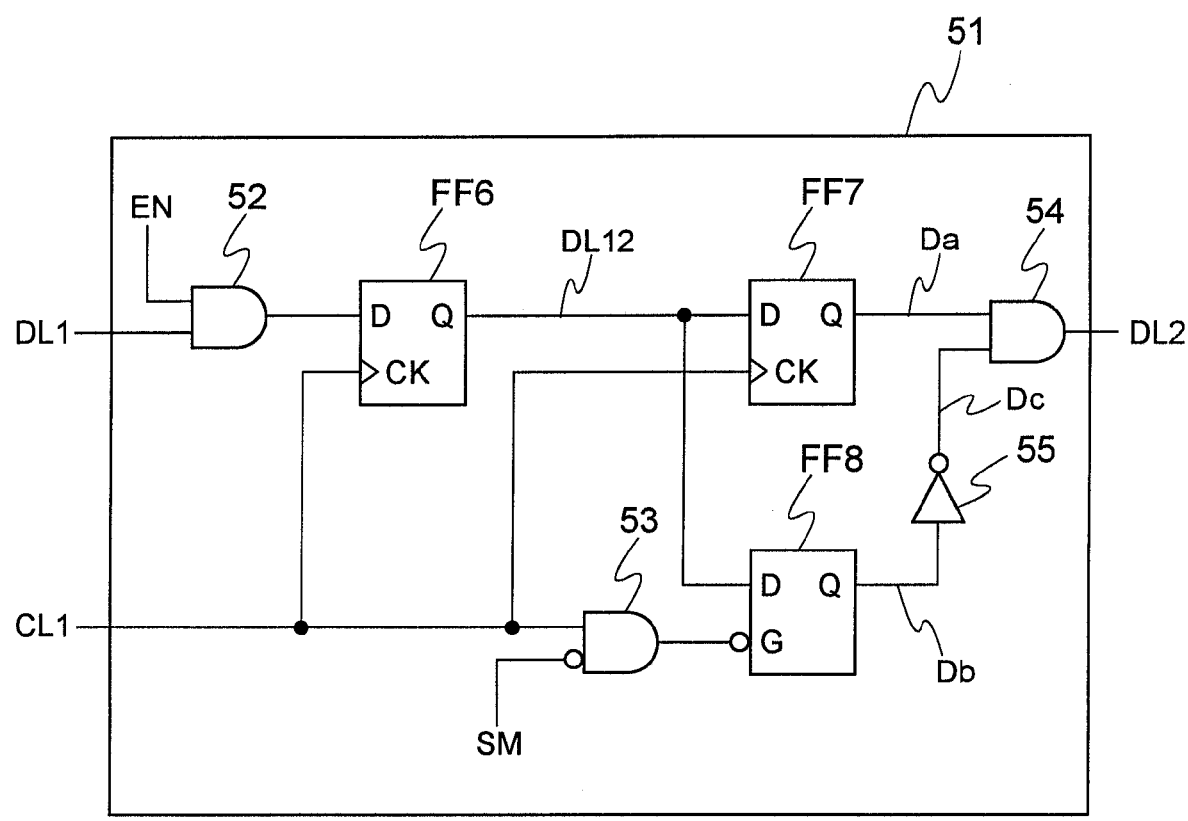
FIG. 6 is a block diagram showing a data loading signal relay unit.

FIG. 6 is a block diagram showing the data loading signal relay unit 51. The data loading signal relay unit 51 includes flip-flops FF6 to FF8, AND circuits 52, 53, and 54, and an inverter 55.

An enable signal EN is supplied to one input of the AND circuit 52 and the data loading signal DL1 is supplied to the other input. The flip-flop FF6 operates synchronously with the first frequency-divided clock CL1, an output signal of the AND circuit 52 is supplied to an input D of the flip-flop FF6 and a signal DL12 is outputted from an output Q.

The flip-flop FF7 operates synchronously with the first frequency-divided clock CL1, the signal DL12 from the flip-flop FF6 is supplied to an input D of the flip-flop FF7, and a signal Da is outputted from an output Q.

The first frequency-divided clock CL1 is supplied to one input of the AND circuit 53 and a scan mode signal SM is supplied to the other input. The flip-flop FF8 operates in response to an inversion signal of the output signal from the AND circuit 53. The signal DL12 from the flip-flop FF6 is supplied to an input D of the flip-flop FF8, and a signal Db is outputted from an output Q.

By the construction mentioned above, the flip-flop FF7 operates at the timing of the leading edge of the first frequency-divided clock CL1 and the flip-flop FF8 operates at the timing of the trailing edge of the first frequency-divided clock CL1.

The signal Da is supplied to one input of the AND circuit 54 and a signal Dc is supplied to the other input. The signal Dc is a signal obtained by inverting a level of the signal Db by the inverter 55. The AND circuit 54 generates the data loading signal DL2 and supplies it to the second function circuit 60.

Figure 7:
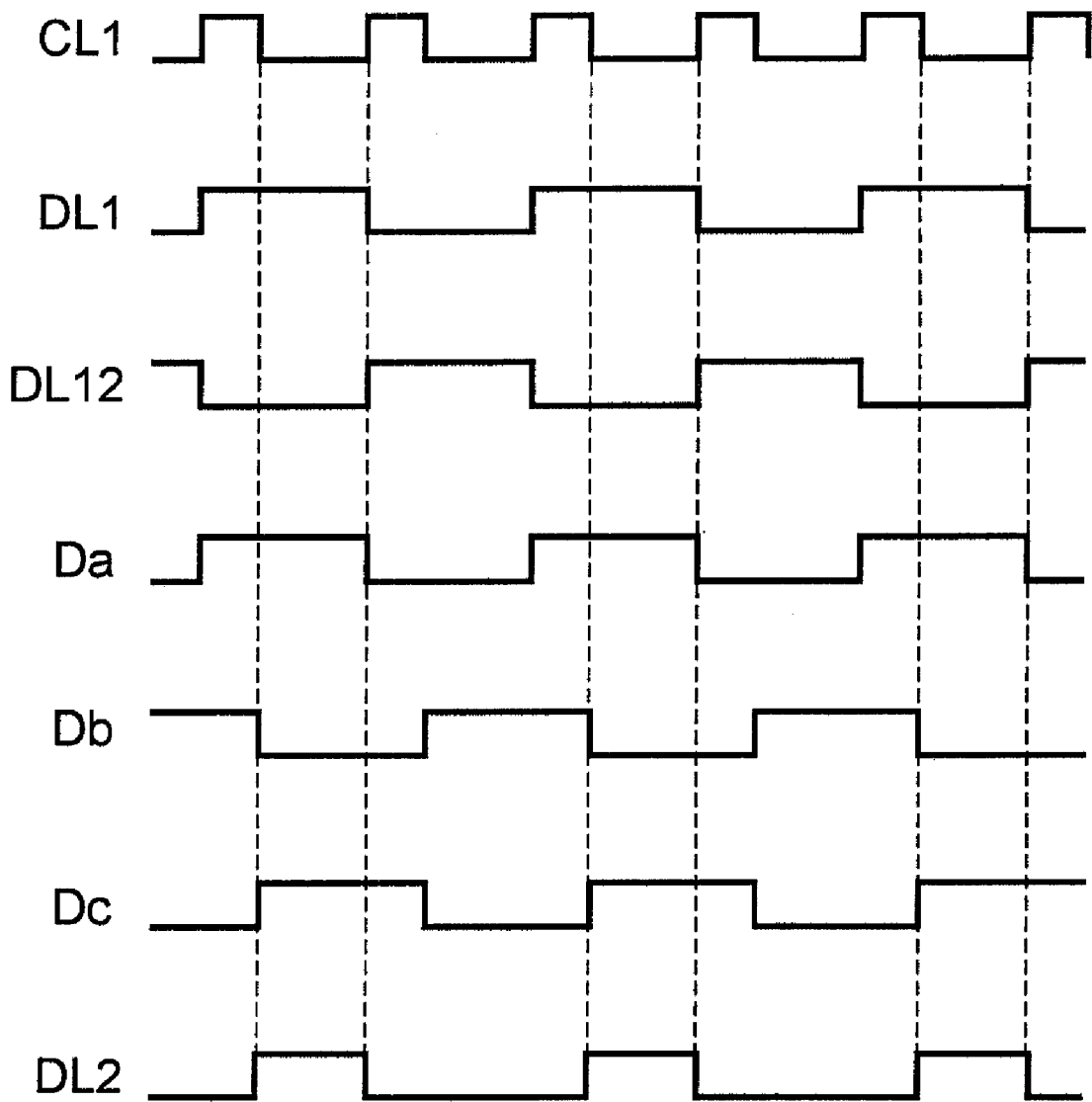
FIG. 7 is a time chart showing signals at the time of adjustment of an existence period of time of the data loading signal by the data loading signal relay unit.

FIG. 7 is a time chart showing signals such as a data loading signal DL2 at the time of adjustment of the existence period of time of the data loading signal by the data loading signal relay unit 51. The existence period of the data loading signal DL2 of "1" (high level) which is generated from the data loading signal relay unit 51 corresponds to the period of time during which the first frequency-divided clock CL1 is at the low level. In other words, the existence period of the data loading signal DL2 of "1" (high level) corresponds to the period of $2/3$ of the period of the first frequency-divided clock CL1. That is, when the frequency ratio between the first frequency-divided clock CL1 and the second frequency-divided clock CL2 is equal to 2:3, the existence period of the data loading signal DL2 corresponds to one period of the second frequency-divided clock CL2.

FIG. 8 is a time chart showing signals such as data loading signals DL1 and DL2 according to the embodiment. The operation of the data transfer system 1 will be described hereinbelow with reference to FIG. 8.

The formation and operation of the source clock SC, first frequency-divided clock CL1, first internal data DN1, information data DT, and second frequency-divided clock CL2 are similar to those in the first embodiment.

When the value of the state Q of the flip-flop FF1 is equal to "0", the value of the state Q of the FF3 is equal to "0", the value of the state Q of the FF2 is equal to "1", and the value of the state Q of the FF4 is equal to "1", the AND circuit 46 included in the data loading signal generating part 40 outputs the decoding signal DC of "1" (high level). Since the flip-flops FF1 to FF4 operate synchronously with the source clock SC, the period of time during which the signal level of the decoding signal DC is equal to "1" (high level) is a period of time corresponding to one period of the source clock.

The decoding signal DC of "1" (high level) is captured by the flip-flop FF5 in response to the leading edge of the first frequency-divided clock CL1 at the just-previous edge timing TC and the data loading signal DL1 is generated. Since the flip-flop FF5 operates synchronously with the first frequency-divided clock CL1, the existence period of the data loading signal DL1 is the existence period corresponding to one period of the first frequency-divided clock CL1. The data loading signal DL1 is, therefore, generated and outputted for the period of time from the just-previous edge timing TC to the edge coincident timing TS.

The data loading signal relay unit 51 included in the first function circuit 50 adjusts the existence period of the data loading signal DL1 and generates the data loading signal DL2 of the period of time corresponding to one period of the second frequency-divided clock CL2. The data loading signal DL2 of "1" (high level) is generated and outputted within the period of "0" (low level) just before the edge coincident timing TS in the first frequency-divided clock CL1.

The second function circuit 60 determines that only the information data DT received in response to the leading edge of the second frequency-divided clock CL2 within the existence period of the data loading signal DL2 of "1" (high level), that is, in response to the leading edge of the second frequency-divided clock CL2 at the edge coincident timing TS is valid, and generates the second internal data DN2. For example, the second function circuit 60 receives the data A transferred from the first function circuit 50 in response to the leading edge of the second frequency-divided clock CL2 at the edge coincident timing TS and generates the data corresponding to the data A as second internal data DN2.

Even if the standard delay occurred in the information data DT (information data DT(typ)) or even if the large delay occurred by the environmental conditions such as temperature and voltage (information data DT(max)), the second function circuit 60 can receive the data A in response to the leading edge of the second frequency-divided clock CL2 at the edge coincident timing TS.

As described above in the data transfer system 1 according to this embodiment, the data loading signal generating part 40 supplies the data loading signal DL2 to the second function circuit 60 through the first function circuit 50. By using the construction as mentioned above, the data loading signal DL2 can be controlled as needed in the first function circuit 50. Since the first function circuit 50 operates synchronously with the first frequency-divided clock CL1, the data loading signal generating part 40 supplies the data loading signal DL1 of the existence period of time corresponding to the period of the first frequency-divided clock CL1 to the first function circuit 50. The first function circuit 50 adjusts the existence period of the data loading signal DL1 to the period of time corresponding to one period of the second frequency-divided clock CL2 and supplies the obtained data loading signal DL2 to the second function circuit 60.

By the adoption of the construction described above, even when the frequency of the second frequency-divided clock CL2 adapted to receive the information data DT is higher than the frequency of the first frequency-divided clock CL1 adapted to transmit the information data DT (for example, in the case of a frequency ratio of 3:2 or the like), such a situation that the leading edge of the second frequency-divided clock CL2 rises twice within the period of time of the data loading signal DL2 of "1" (high level) can be prevented. That is, it is possible to construct in such a manner that the same information data DT is not captured twice in response to the leading edge of the second frequency-divided clock CL2.

Additionally, the second function circuit 60 can normally receive the information data DT(typ) in the case where the standard delay occurred due to the internal delay in the circuit and the wiring delay and can also normally receive the information data DT(max) in the case where the large delay occurred by the environmental conditions such as temperature and voltage. That is, even if the delay of one period of the second frequency-divided clock CL2 occurred in the information data DT (that is, even if the information data DT arrived at the second function circuit 60 at the timing TX) in terms of the arrival timing TC of the information data DT to the second function circuit 60 in the case where there is no delay that is caused by the environmental conditions such as voltage, the second function circuit 60 can normally receive the information data DT.

As described above in the data transfer system 1 according to the embodiment, the data loading signal DL can be adjusted as needed in the function circuit on the data transmission side, in addition to the feature that the data can be surely transmitted and received between the two function circuits which operate synchronously with the clocks of the different frequencies.

Although the first and second embodiments have been described with respect to the example in the case where the first frequency-divided clock generating part 20 frequency-divides the source clock into one third frequency and the second frequency-divided clock generating part 30 frequency-divides the source clock in frequency into half frequency, the combination of the clock frequency division is not limited to the above example but the invention can cope with two or more frequency-divided clocks whose frequency-dividing ratio is equal to an integer times. For example, a combination of a ¼ frequency-divided clock and a ⅙ frequency-divided clock or the like may be used. In the case, since the leading edges or the trailing edges of the first frequency-divided clock and the second frequency-divided clock coincide every 12 periods of the source clock, it is sufficient to form the data loading signal so that the transfer data can be captured at the coincident timing. Although the first and second embodiments have been described with respect to the example in the case where the operation is executed synchronously with the leading edge, the operation may be executed synchronously with the trailing edge.

Although the first and second embodiments have been described with respect to the example in the case where the information data DT is transferred from the first function circuit 50 to the second function circuit 60. Conversely, in the case where the information data DT is transferred from the second function circuit 60 to the first function circuit 50 or in the information data DT is bidirectionally transferred between the first function circuit 50 and the second function circuit 60, the transfer data can be also surely transmitted and received by a similar construction.

This application is based on Japanese Patent Application No. 2008-299432 which is incorporated herein by reference.

What is claimed is:

1. A data transfer system comprising:
    a source clock generating part for generating a source clock;
    a frequency-divided clock generating part for generating a first frequency-divided clock and a second frequency-divided clock having different periods by frequency-dividing said source clock;
    a first function circuit which operates synchronously with said first frequency-divided clock and generates information data; and
    a second function circuit which operates synchronously with said second frequency-divided clock and receives said information data,
    wherein said system further includes a data loading signal generating part for generating a data loading signal just before coincident timing when an edge of said first frequency-divided clock and an edge of said second frequency-divided clock coincide, and said second function circuit determines that only the reception of said information data within an existence period of time of said data loading signal is valid.

2. A system according to claim 1, wherein said data loading signal generating part generates said data loading signal within an interval between said coincident timing and timing of the edge of said second frequency-divided clock just before said coincident timing.

3. A system according to claim 2, wherein said data loading signal generating part discriminates the timing of the edge of said second frequency-divided clock just before said coincident timing on the basis of a signal level of said first frequency-divided clock and a signal level of said second frequency-divided clock.

4. A system according to claim 3, wherein said data loading signal generating part includes four flip-flops for holding a present signal level of said first frequency-divided clock, a just-previous signal level of said first frequency-divided clock, a present signal level of said second frequency-divided clock, and a just-previous signal level of said second frequency-divided clock synchronously with said source clock and discriminates the timing of the edge of said second frequency-divided clock just before said coincident timing on the basis of the signal level held in each of said four flip-flops.

5. A system according to claim 1, wherein said first function circuit relays a signal obtained by adjusting an existence period of said data loading signal in correspondence to the period of said second frequency-divided clock as a new data loading signal to said second function circuit.

* * * * *